United States Patent
Mirzeabasov et al.

(10) Patent No.: US 12,066,005 B2
(45) Date of Patent: Aug. 20, 2024

(54) WIND TURBINE AND WIND POWER STATION BASED THEREON

(71) Applicant: OBSCHESTVO S OGRANICHENNOJ OTVETSTVENNOST'YU ANTER, Saint Petersburg (RU)

(72) Inventors: Timur Ahmedbekovich Mirzeabasov, Lomonosov (RU); Svetlana Timurovna Romanova, Lomonosov (RU); Dmitrij Olegovich Belov, Saint Petersburg (RU); Maksim Dmitrievich Belov, Saint Petersburg (RU); Pavel Dmitrievich Belov, Saint Petersburg (RU); Pozvejn Vladimirovich Sangi, Odintsovo (RU)

(73) Assignee: OBSCHESTVO S OGRANICHENNOJ OTVETSTVENNOST'YU ANTER, Saint Petersburg (RU)

( * ) Notice: Subject to any disclaimer, the term of this patent is extended or adjusted under 35 U.S.C. 154(b) by 0 days.

(21) Appl. No.: 17/770,718

(22) PCT Filed: Oct. 21, 2020

(86) PCT No.: PCT/RU2020/050287
§ 371 (c)(1),
(2) Date: Apr. 21, 2022

(87) PCT Pub. No.: WO2021/080468
PCT Pub. Date: Apr. 29, 2021

(65) Prior Publication Data
US 2022/0372951 A1    Nov. 24, 2022

(30) Foreign Application Priority Data
Oct. 22, 2019    (RU) .......................... RU2019133572

(51) Int. Cl.
*F03D 3/04* (2006.01)
*F03D 3/00* (2006.01)
(Continued)

(52) U.S. Cl.
CPC .............. *F03D 3/04* (2013.01); *F03D 3/005* (2013.01); *F03D 3/064* (2013.01); *H02K 7/183* (2013.01);
(Continued)

(58) Field of Classification Search
CPC ............ F03D 3/04; F03D 3/005; F03D 3/064; H02K 7/183; F05B 2240/9112
See application file for complete search history.

(56) References Cited

U.S. PATENT DOCUMENTS

| | | | | |
|---|---|---|---|---|
| 4,039,849 | A * | 8/1977 | Mater | F03D 9/25 290/55 |
| 6,740,989 | B2 * | 5/2004 | Rowe | F03D 80/70 415/4.4 |

(Continued)

FOREIGN PATENT DOCUMENTS

| | | |
|---|---|---|
| ES | 2397033 A1 | 3/2013 |
| RU | 2246634 C2 | 2/2005 |

(Continued)

OTHER PUBLICATIONS

International Search Report of the International Searching Authority dated Mar. 4, 2021, issued in corresponding International Patent Application No. PCT/RU2020/050287 (and English translation).

(Continued)

*Primary Examiner* — Sean Gugger
(74) *Attorney, Agent, or Firm* — Posz Law Group, PLC

(57) ABSTRACT

Proposed is a wind turbine having a vertical axis rotor mounted in a fixed cylindrical housing provided with outwardly opening shutters. The rotor consists of a rotating core comprising core blades fastened between two circular bases and forming a Ugrinsky rotor, and an annular impeller configured for independent rotation about said core. The impeller comprises impeller blades fastened between two ring-shaped bases and forming a continuation of the core blades, wherein common inter-blade channels are formed which narrow toward the centre of the rotor. Also proposed are wind power stations based on the wind turbines described above, said turbines being mounted vertically one above the other to form a generating tower, or being mounted on a facade of a high-rise building. Technical result consists, in particular, in increasing the efficiency of the (Continued)

wind turbine and making it possible to incorporate wind power stations into an urban environment.

14 Claims, 4 Drawing Sheets

(51) Int. Cl.
  *F03D 3/06* (2006.01)
  *H02K 7/18* (2006.01)
(52) U.S. Cl.
  CPC . *F05B 2220/706* (2013.01); *F05B 2240/9112* (2013.01)

(56) References Cited

U.S. PATENT DOCUMENTS

| | | | | |
|---|---|---|---|---|
| 7,969,036 B2* | 6/2011 | Chung | ................ | F03D 9/25 290/55 |
| 11,655,798 B2* | 5/2023 | Lerner | ................ | F03D 9/25 290/55 |

FOREIGN PATENT DOCUMENTS

| | | |
|---|---|---|
| RU | 2294452 C1 | 2/2007 |
| RU | 78878 U1 | 12/2008 |
| RU | 126766 U1 | 4/2013 |
| RU | 2511780 C1 | 4/2014 |
| WO | 2017/191492 A1 | 11/2017 |

OTHER PUBLICATIONS

Russian search report dated Oct. 22, 2019 issued in corresponding Russian patent application No. 2019133572/12 (and English translation).

* cited by examiner

WIND TURBINE AND WIND POWER STATION BASED THEREON

CROSS REFERENCE TO RELATED APPLICATIONS

This application is a U.S. national stage application of PCT/RU2020/050287 filed on Oct. 21, 2020, which is based on Russian Patent Application No. 2019133572 filed on Oct. 22, 2019, the contents of which are incorporated herein by reference.

TECHNICAL FIELD TO WHICH THE INVENTION RELATES

The invention relates to wind turbines, namely to a wind turbine having a vertical axis rotor and a wind power station based thereon.

BACKGROUND ART

Wind turbines, also called wind electric units, are devices for converting the kinetic energy of the wind flow into the mechanical energy of the rotation of the turbine rotor, followed by its conversion into electrical energy. By the type of turbines, wind turbines are divided into units with a horizontal and a vertical axis of rotation. The most common are wind turbines with a horizontal axis of rotation, their efficiency in practice reaches 40%, but they entail a number of fundamental disadvantages. The power of a wind generator depends on the air power determined by the wind speed and the swept area, so the size of the rotors of industrial generators of this type is very large. Such wind turbines are bulky, expensive to manufacture, install and operate. Operation of wind turbines with large rotors (from 1 meter and more) brings about characteristic noise and vibrations which cause significant discomfort to humans, whereby operation thereof in a populated and, especially, urban area is limited or prohibited. Further challenges in the operation of such turbines are the icing of rotor blades and the need to brake them when the wind load increases excessively. In addition, rotors of turbines of this type often kill birds.

Some of the disadvantages are evaded in wind turbines with a vertical axis of rotation, which can be based on rather compact vertical axis rotors, the operation of which does not cause the human-perceived noise and vibration. Such wind turbines can be installed in urban conditions, in particular on roofs of high-rise buildings. To increase power, compact vertical axis rotors can be combined into wind power stations.

For instance, a wind engine is known (RU2294452 C1, published Feb. 27, 2007), consisting of sections installed one above the other each comprising a hollow cylindrical rotor with vertical blades located in the airflow guide stator. The stator, in turn, comprises vertical blades installed between round rigid bases. Rotor blades and stator blades are parts of cylindrical surfaces arranged with their convexity along the rotor rotation. The radius of curvature of the stator blades is greater than the radius of curvature of the rotor blades, and the number of blades of each stator section is twice as large as the number of blades of each cylindrical element of the rotor. The described stator creates a directional swirling airflow for the rotor, optimizing its operating conditions and increasing the efficiency of the wind engine. The sectional design makes it possible to scale the dimensions of the wind generator heightwise, increasing the swept area (of rotors in all sections), thereby increasing the power, simplifying the maintenance and installation of the generator.

However, the design of the turbine based on a stator with fixed blades is not optimal in terms of efficiency. The known solution provides only for scaling the dimensions of the wind turbine heightwise. Such a rotor remains potentially dangerous for birds. The issue of protecting the rotor from excessive wind load is also not solved. However, said wind engine is the closest technical solution to the claimed invention and is selected as its prototype.

In today's society, there is a constant need to develop energy systems based on renewable energy sources, including wind turbines. Improving the efficiency of wind turbines and wind power stations, and devising wind turbines that can be incorporated in urban environments, such as high-rise buildings, are highly desirable. The present invention is aimed at solving these problems.

DISCLOSURE OF THE INVENTION

According to the present invention, proposed is a wind turbine with a vertical axis rotor, characterized in that the rotor is mounted in a fixed cylindrical housing equipped with outwardly opening shutters, and consists of a rotating core comprising core blades fastened between two round bases and forming the Ugrinsky rotor, and an annular impeller configured to independently rotate around the core and comprising impeller blades fastened between two annular bases, wherein the impeller blades are configured to form in the rotor cross-section a continuation of the core blades with the formation of common inter-blade channels tapering towards the rotor center.

The described turbine can be quite compact, about 500-1000 mm in height and 300-800 mm in width, and is characterized by high efficiency of operation, especially at low wind speeds. The impeller, which independently rotates around the core, reduces the reverse torque of the core and increases the power of the turbine, as is the case with the stator in the prototype. An additional increase in turbine power is achieved due to making the rotor from two matched parts: the impeller blades form a continuation of the core blades in the cross-section of the rotor, forming common inter-blade channels. Thus, the impeller and the core have the same number of blades. The tapering of the inter-blade channels towards the center of the rotor provides an increase in the speed of the incoming airflow, increasing the efficiency and ensuring the efficiency of the turbine even at low airflow speeds. Herewith, the impeller starts moving first, at low wind flow speeds, thereby initiating earlier rotation onset of the core.

The presence of a protective housing with closing shutters ensures the protection of the turbine rotor and the safety of birds. In addition, it is possible to provide scalable wind power stations that combine a plurality of such turbines into a single generating complex. Thus, the proposed turbine can be used to design wind turbines for both industrial, commercial, and domestic, private use.

According to an embodiment, the core blades and the impeller blades of the wind turbine are inclined relative to the vertical axis of the rotor. In particular, the core blades may have an inclination opposite the inclination of the impeller blades relative to the vertical axis of the rotor. Thus, the airflow is continuously split into different inter-blade channels inside the rotor to further increase the efficiency of the turbine, especially at low wind flow speeds.

According to an embodiment, the wind turbine housing shutters are configured to form, in the open state, a continuation of the impeller blades in the cross-section of the rotor. In this case, the housing shutters take on the role of the prototype's stator blades, thereby optimizing the working conditions and increasing the efficiency of the composite rotor. Also, the shutters can be equipped with horizontal restrictors of the incoming airflow, extending at a right angle from the inner surface on the upper and lower faces of each shutter. Thus, all components of the rotor collectively are configured to form common inter-blade channels tapering from the edges of the housing shutters with the restrictors towards the central axis of the rotor.

According to an embodiment, the turbine core blades form a plurality of inter-blade channels tapering towards the center, one of which is through and forms the Ugrinsky rotor. Embodiments are also possible in which the core blades form more than one through inter-blade channel having the geometry of the Ugrinsky rotor; e. g., two, three or four such channels. According to another embodiment, the turbine core base and impeller base are in the form of wedge-shaped surfaces that provide a tapering of the inter-blade channels vertically towards the central axis of the rotor. Thus, there is tapering of the inter-blade channels, both horizontally and vertically, to accelerate the airflow inside the rotor.

According to a further embodiment, the wind turbine comprises a housing shutter control system configured to open and close the shutters automatically, depending on the wind load that may be measured by the respective sensor(s) inside and/or outside the rotor housing. Thus, a substantially constant incoming airflow speed is provided for stable operation of the rotor.

According to another embodiment, the wind turbine comprises a system for heating the internal space and/or the external surface of the housing. In addition, the turbine housing can be equipped with a condensate drainage system. Thus, it is possible to operate the turbine essentially in any weather and climatic conditions.

According to a further embodiment, the wind turbine comprises two disk generators located in the lower and upper part of the turbine housing and connected to the bases of the core and/or impeller for electrical power generation. For example, the disk generator at the lower part of the turbine housing may be connected to the base of the core, and the disk generator at the upper part of the turbine housing may be connected to the base of the impeller.

In another aspect, the invention provides a wind power station comprising a plurality of the above-described wind turbines mounted vertically on each other to form a generating column, wherein the turbines operate independently of each other. An energy storage device, preferably configured to provide energy to consumers, may be provided at the base of the column. Such a wind power station will have all the advantages of the wind turbines described above. Also, the wind power station of such layout is easily scalable, is distinguished by ease of installation and maintenance. Indeed, depending on the problem to be solved, the wind power station can be implemented with equal success in the form of a compact column of several turbine cells, or in the form of a large stand-alone column of a plurality of turbine cells. A plurality of such wind power station columns can be combined into a generating array of substantially any area and power.

Finally, the invention provides a wind power station comprising a plurality of wind turbines described above, mounted on the facade of a high-rise building to form a generating complex for delivering energy to the building and/or external consumers, the turbines of which operate independently of each other. Preferably, the turbines of such a wind power station are evenly distributed over the facade of the building, starting at a height of about 30 meters from the base of the building, where high and substantially constant wind load is encountered. Such a wind power station retains all the above-mentioned advantages of the wind power station and wind turbines. In addition, due to the compactness of the turbines, use of such wind power stations in high-rise buildings does not require much expense. Compact turbines can be arranged on the facade without significant deterioration of the appearance of the building, hidden or embedded in the design of the building. At the same time, the high-rise building becomes a high-power plant, capable not only of meeting its own electricity needs, but also of supplying electricity to external consumers, e. g., at night, when electricity consumption inside the building is limited.

The achieved technical result consists in improvement of efficiency of wind generators and wind power stations based thereon. In addition, the invention provides the possibility of incorporating wind power stations into the urban environment, increases the stability of operation and provides automated protection of wind turbine rotors from excessive wind load, reduces the danger of wind power stations for birds.

BRIEF DESCRIPTION OF THE DRAWING

Some embodiments are described below with reference to the accompanying drawings, in which.

DETAILED DESCRIPTION

Figure 1:
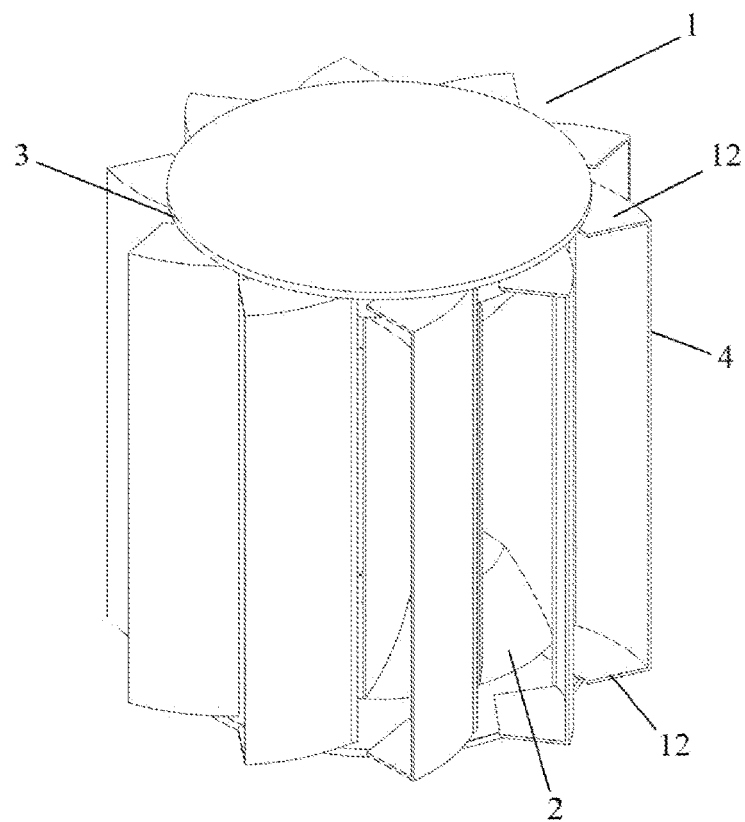
FIG. 1 is a general view of a wind turbine according to the invention.
Figure 2:
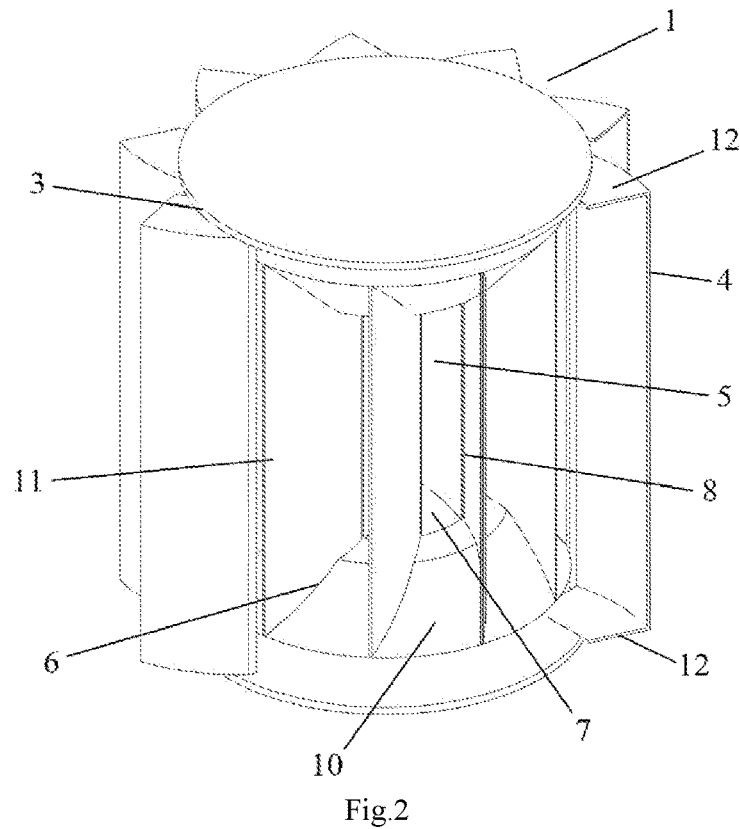
FIG. 2 is a view of the wind turbine of FIG. 1 without three shutters of the housing.
Figure 3:
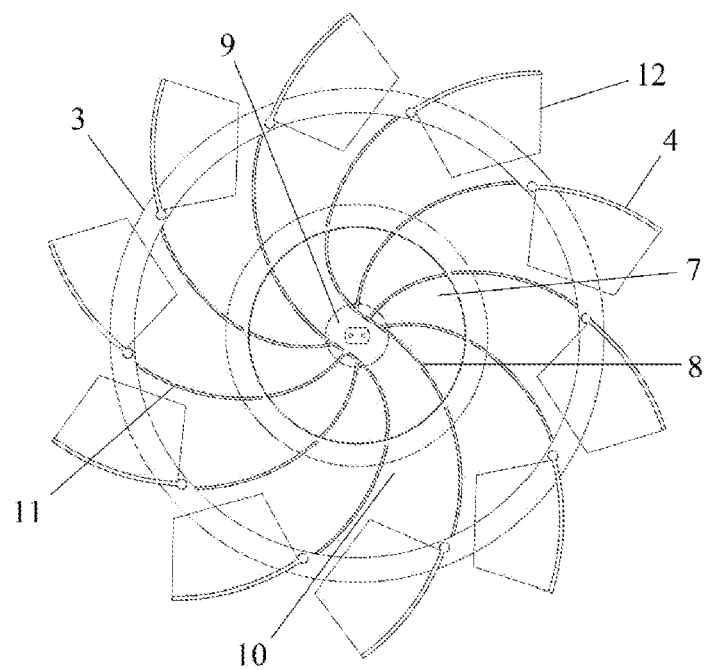
FIG. 3 is a horizontal cross-section of the turbine of FIG. 1.
Figure 4:
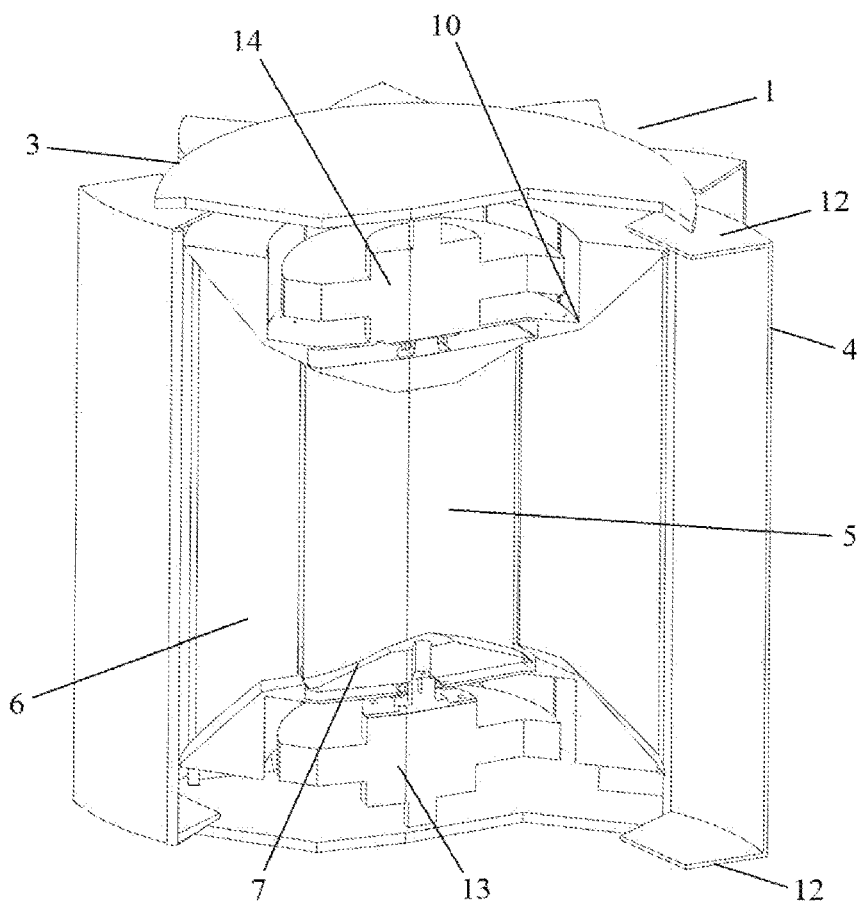
FIG. 4 is a vertical cross-section of the turbine of FIG. 1.

The general view of the wind turbine 1 according to the invention is shown in FIG. 1. The wind turbine 1 has a vertical axis rotor 2 mounted in a cylindrical housing 3 equipped with outwardly opening shutters 4. As can be seen in FIGS. 2-4, the rotor 2 consists of a rotating core 5 and an annular impeller 6. The core 5 comprises core blades 8 fastened between two bases 7. The core blades 8 form the Ugrinsky rotor—the central through inter-blade channel 9, the walls of which have a profile in the form of the letter S, and the width of the channel at the central point is about ⅔ of the width of the channel opening, as shown in FIG. 3. The impeller 6, in turn, comprises the impeller blades 11 fastened between the two annular bases 10 and is configured to independently rotate around the core 5.

As can be seen in FIG. 3, illustrating the corresponding static position of the composite rotor 2, the impeller blades 11 form a continuation of the core blades 8 in the cross-section of the rotor 2. Thus, the blades of the core and of the impeller together form a plurality of common inter-blade channels tapering towards the center of the rotor 2, wherein one of these channels, channel 9, is through and has the geometry of the Ugrinsky system rotor.

The core blades 8 and the impeller blades 11 may be fastened with inclination in relation to the vertical axis of the rotor 2 (not shown in the figures). Moreover, in one embodiment of the turbine 1, the core blades 8 may have an inclination opposite to the inclination of the impeller blades 11 relative to the vertical axis of the rotor 2.

In the open state, the housing shutters 4, as shown in FIG. 3, also form a continuation of the impeller blades 11, and, respectively, of the core blades 8, in the cross-section of the rotor 2. Additionally, the shutters 4 may be provided with horizontal restrictors 12 of the incoming airflow extending at a right angle from the inner surface on the upper and lower faces of each shutter 4, as shown in FIG. 1-3. Thus, all components of the rotor 2 together are configured to form common inter-blade channels tapering from the edges of the housing shutters 4 to the central axis of the rotor 2.

With reference to FIG. 4, the core bases 7 and the impeller bases 10 are in the form of wedge-shaped surfaces that provide a tapering of the inter-blade channels vertically towards the central axis of the rotor 2.

The components of the wind turbine 1 according to the invention, in particular the core 5 and the impeller 6, can be made of different materials, depending on the field of application of the turbine, including metal, plastic and/or rubber, by any known manufacturing methods, including forging, stamping, casting, machining and 3D (three-dimensional) printing.

In a preferred embodiment, the wind turbine 1 comprises a housing shutter control system configured to open and close the housing shutters 4 in an automatic mode, depending on the wind load, which can be measured by a suitable sensor(s) mounted inside and/or outside the rotor housing 3 (not shown in the figures). In particular, the wind load may be measured by a pressure sensor(s), or may be estimated from readings of a tachometer(s) measuring the rotational speed of the core 5 and/or the impeller 6.

The opening and closing of the housing shutters 4 are carried out in an adjustable manner, so that the shutters 4 can be fixed in any intermediate position, between the extreme positions of full closure and full opening. Thus, the housing shutter control system may regulate the airflow, ensuring substantially uniform incoming airflow speed for stable operation of the rotor 2, as well as automatic protection of the rotor 2 from excessive wind load. The housing shutter control system may be implemented based on a suitably programmed processor and actuators, by any means known to those skilled in the art. The presence of a control system in each individual wind turbine 1 provides the possibility of independent operation of the turbine, including its independent functioning within the wind power station.

In addition, the wind turbine 1 may comprise a system for heating the internal space and/or external surface of the housing 3. The turbine housing 3 can also be equipped with a condensate drainage system. The heating system can be implemented on the basis of electric heating elements, preferably powered by electricity generated by the turbine 1 itself. The condensate drainage system may be an appropriate system of conduits for removing moisture from the housing 3. These systems provide the possibility of operating the turbine 1 in essentially any weather and climatic conditions.

The heating system can operate coherently together with the shutter control system of the wind turbine housing 1, e. g., under the control of the same processor. In particular, in the event of icing of the blades of the rotor 2 in extreme weather conditions, when the heating system cannot provide sufficient heating of the wind turbine 1 in normal operation, the housing shutter control system can switch to the operation mode with the shutters 4 periodically closed to warm the rotor 2 by the heating system.

In a preferred embodiment, the wind turbine 1 comprises two disk generators 13 and 14 arranged in the lower (generator 13) and upper (generator 14) parts of the turbine housing and connected to the core bases 7 and/or impeller bases 10 for electrical power generation. For example, the disk generator 13 at the lower part of the turbine housing 3 may be connected to the lower base 7 of the core, and the disk generator 14 at the upper part of the turbine housing 3 may be connected to the upper base 10 of the impeller, as shown in FIG. 4.

In addition, in a preferred embodiment, the wind turbine 1 is equipped with an integrated energy storage device to supply the turbine 1 elements with electricity generated by the turbine 1 itself. The energy storage device may be based on an ionistor (supercapacitor) and located in a separate compartment above the housing 3 of the wind turbine 1 (not shown in the figures) together with the turbine 1 control system. However, the invention is not limited in this respect and the energy storage device can be based on rechargeable batteries of other types arranged inside or outside the turbine housing 3.

During operation of the wind turbine 1 according to the invention, the impeller 6 begins to rotate first, at a low wind flow speed, only about 1 m/s, initiating the rotation of the core 5. At the initial stage, the rotational speeds of the impeller 6 and the core 5 are about 20-40 rpm. Depending on the wind and other conditions of operating the turbine 1, the impeller 6 and the core 5 can rotate at the same, close or substantially different speeds. As the wind load increases, the rotational speeds of the impeller 6 and the core 5 increase. When the maximum rotation speed of the rotor 2 components is reached, about 700-800 rpm, the housing shutter control system limits the wind flow by adjusting the opening of the housing shutters 4 to stabilize the operation of the rotor 2 and protect it from excessive loads. The maximal speed of rotation of the rotor 2 components is selected based on the parameters of the wind turbine 1, in particular, the dimensions and weight of the impeller 6 and the core 5, to improve reliability and increase the service life of the turbine 1.

Figure 5:
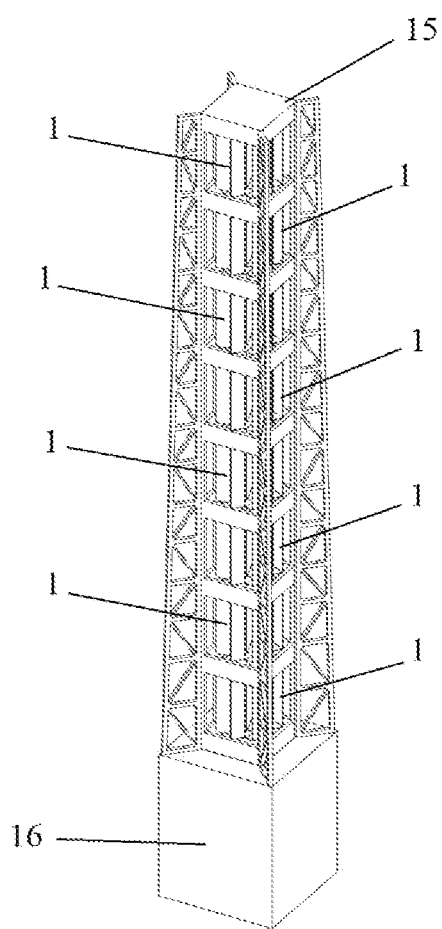
FIG. 5 is a general view of a wind power station in the form of a column of wind turbines according to the invention.

With reference to FIG. 5, the wind power station according to one embodiment of the invention comprises a plurality of wind turbines 1 installed vertically on each other to form a generating column 15 in which the turbines operate independently of each other. An energy storage device 16 is provided at the base of the generating column 15, preferably configured to provide energy to consumers. Notably, FIG. 5 shows only an exemplary view of a wind power station in the form of a column 15 with cells vertically arranged one above the other and comprising wind turbines 1. In practice, the wind power station generating column 15 of the invention may be implemented in a different manner. The wind power station according to the invention is characterized by ease of scaling as well as ease of installation and maintenance. Indeed, since the turbines 1 in the generating column 15 function independently of each other, the maintenance of one turbine 1, including its replacement in the event of failure, can be carried out without stopping the operation of the wind power station. The wind power station may as well be implemented as a compact column of several turbine cells, e. g., for installing on the roof of a high-rise building, or as a large, freestanding column of a plurality of turbine cells, as shown in FIG. 5. A plurality of such wind power station columns 15 can be combined into a generating array of substantially any area and power.

Figure 6:
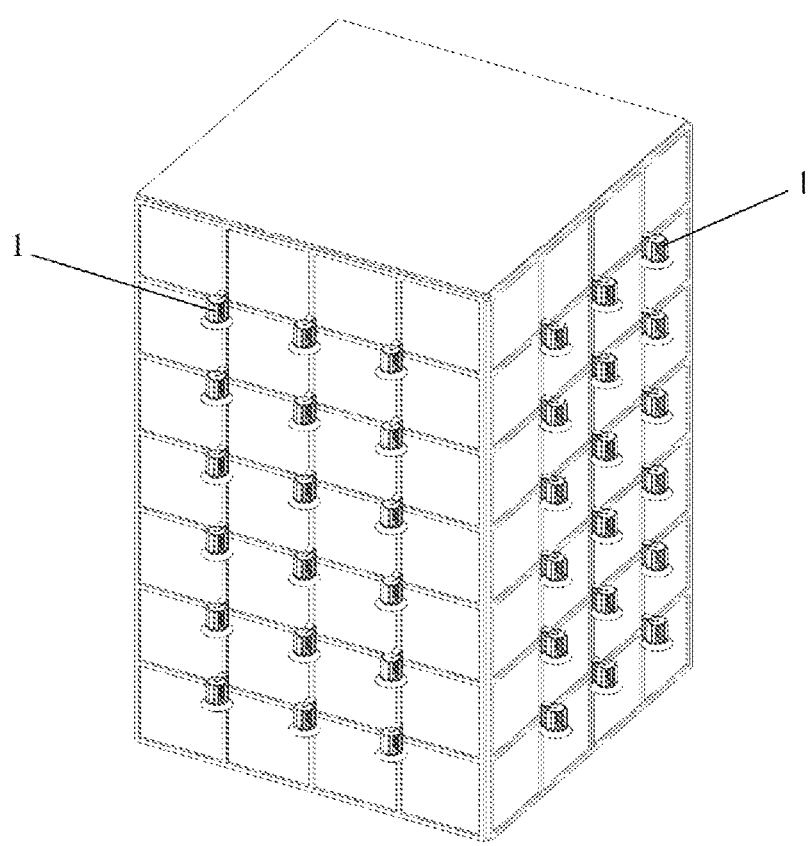
FIG. 6 is a general view of a wind power station comprising the wind turbines according to the invention, mounted on the facade of a high-rise building.

FIG. 6 shows a general view of a wind power station according to another embodiment of the invention, consisting of a plurality of wind turbines 1 mounted on the facade of a high-rise building to form a generating complex for delivering energy to the building and/or external consumers. The turbines 1 of said complex also function independently of each other. Preferably, the turbines 1 of the wind power station are evenly distributed over the facade of the building, starting at a height of about 30 meters from the base of the building, where high and substantially constant wind load is encountered. Due to the compactness of the turbines 1, use of such wind power stations in high-rise buildings does not require much expense. Compact turbines 1 can be arranged on the facade without significant deterioration of the appearance of the building, hidden or embedded in the design of the building. At the same time, the high-rise building becomes a high-power plant, capable not only of meeting its own electricity needs, but also of supplying electricity to external consumers, e. g., at night, when electricity consumption inside the building is limited.

The design of the wind turbines according to the invention makes it possible to provide highly efficient wind power stations of a wide variety of types, without being limited to the above-described embodiments. For example, the wind power station can be implemented on the basis of a pole (a lighting pole or a specially installed one), in the upper part of which one or more wind turbines 1 can be installed, and in the base, there is an energy storage device with a device for providing energy to consumers. Such an embodiment of a wind power station can be successfully used to recharge electric vehicles in urban environments or on motorways. In another embodiment, the wind turbines according to the invention can be installed on cell towers, which will allow efficient and rapid deployment of a cellular communication network in hard-to-reach and under-exploited territories, regardless of the availability of power in the area.

In addition, the invention makes it possible to avoid the disposal of high-rise pipes and columns of obsolete heating plants, CHP (combined heat and power) plants and other industrial structures, transforming them into environmentally friendly wind power stations without significant costs.

It should be understood that the embodiments described above in order to disclose and explain the essence of the invention do not in any way limit the scope of legal protection defined exclusively by the claims.

The invention claimed is:

1. A wind turbine with a vertical axis rotor, wherein the rotor is mounted in a fixed cylindrical housing equipped with outwardly opening shutters, and consists of a rotating core comprising core blades fastened between two round bases and forming a Ugrinsky rotor, and an annular impeller configured to independently rotate around the core and comprising impeller blades fastened between two annular bases, wherein the impeller blades are configured to form in a cross-section of the rotor a continuation of the core blades with the formation of common inter-blade channels tapering towards the rotor center.

2. The wind turbine of claim 1, wherein the core blades and impeller blades are inclined relative to the vertical axis of the rotor.

3. The wind turbine of claim 2, wherein the core blades have an inclination opposite to the inclination of the impeller blades relative to the vertical axis of the rotor.

4. The wind turbine of claim 1, wherein the housing shutters are configured to form, in the open state, a continuation of the impeller blades in the cross-section of the rotor.

5. The wind turbine of claim 4, wherein the housing shutters are equipped with horizontal restrictors of the incoming airflow extending at a right angle from the inner surface on the upper and lower faces of each shutter.

6. The wind turbine of claim 1, wherein the core blades form a plurality of inter-blade channels tapering towards the center, one of which is through and forms the Ugrinsky rotor.

7. The wind turbine of claim 1, wherein the core base and the impeller base are in the form of wedge-shaped surfaces that provide a tapering of the inter-blade channels vertically towards the central axis of the rotor.

8. The wind turbine of claim 1, comprising a housing shutter control system configured to open and close the shutters automatically, depending on a wind load.

9. The wind turbine of claim 1, comprising a system for heating the internal space and/or the external surface of the housing.

10. The wind turbine of claim 9, the housing of which is equipped with a condensate drainage system.

11. The wind turbine of claim 1, comprising two disk generators located in the lower and upper part of the turbine housing and connected to the bases of the core and/or impeller for electrical power generation.

12. A wind power station comprising a plurality of wind turbines according to claim 1 mounted vertically on each other to form a generating column, wherein the turbines operate independently of each other.

13. The wind power station according to claim 12, wherein an energy storage device is provided at the base of the column, which is configured to provide energy to consumers.

14. A wind power station comprising a plurality of wind turbines according to claim 1 mounted on a facade of a high-rise building to form a generating complex for delivering energy to the building and/or external consumers, the turbines of which operate independently of each other.

* * * * *